United States Patent Office 2,839,509
Patented June 17, 1958

2,839,509

VINYL CHLORIDE-DIALKYL MALEATE COPOLYMERIZATION PROCESS

Harold K. Garner, Packanack Lake, N. J., assignor to United States Rubber Company, New York, N. Y., a corporation of New Jersey No Drawing. Application April 28, 1955
Serial No. 504,660

3 Claims. (Cl. 260—78.5)

This invention relates to improved binary copolymers of vinyl chloride and dialkyl esters of maleic acid, and to an improved method of making them.

Dialkyl maleate/vinyl chloride binary copolymers are known in the prior art. However, when there are more than seven carbon atoms in the alkyl groups of the maleic esters, difficulties are encountered in the preparation of copolymers from these long-chain dialkyl maleates. This invention is concerned with a method of surmounting these difficulties.

The lower maleates (i. e., carbon chains of seven or less in the alkyl groups) will copolymerize satisfactorily with vinyl chloride when emulsion recipes are used. However, when emulsion recipes are used on dialkyl maleates with alkyl groups containing more than seven carbon atoms, the polymer obtained is nearly pure polyvinyl chloride. This failure of the maleate ester to copolymerize with the vinyl chloride results from the extremely low rate of diffusion of the maleate through the water; it simply cannot reach the polymerization sites.

Suspension polymerization of vinyl chloride and dialkyl maleates on the other hand gives copolymers of the expected composition. However, when the alkyl groups each contain eight or more carbon atoms, ordinary suspension polymerization is unsatisfactory and it is necessary to use the special techniques of my invention. Ordinary loading procedures used in conventional suspension polymerization result in uneven distribution of maleate and catalyst through the dispersed monomer phase. Since mechanical exchange between droplets is not extensive, this non-uniformity often persists in the resulting polymer. Such non-homogeneous distribution may be detected physically by the presence of "fish eyes" in a sample molded from this polymer. These "fish eyes" may be separated from the matrix and shown by their chlorine analysis to be nearly pure polyvinyl chloride. In contrast, polymers prepared by the method of my invention are clear, completely homogeneous, i. e., of substantially uniform composition throughout, and free from such undesirable, non-homogeneous "fish eyes." Such "fish eyes" are undesirable since, in addition to contributing to poor appearance, they usually are a focal point for decomposition, giving poor aging characteristics to a polymer containing them. The non-homogeneous spots, being almost pure polyvinyl chloride, are hard and rough, and when polymers containing them are fabricated into thin sheets as by calendering, a rough-surfaced product having a poor appearance is obtained due to protrusion of the particles. My process, by avoiding such unequal distribution, produces a material that is of better appearance and has better aging characteristics than material produced using conventional suspension polymerization methods.

My invention is based upon the discovery that the foregoing disadvantages encountered when attempting to make binary copolymers of vinyl chloride and the di-($C_8$ and higher)-alkyl maleates can be readily overcome by forming a homogeneous water-immiscible solution of the monomeric dialkyl maleate and an oil-soluble catalyst of free radical polymerization (such as any of the organic peroxides, e. g., benzoyl peroxide or lauroyl peroxide, or azo-type catalysts, e. g., azo-bis-isobutyronitrile, etc. commonly used in suspension polymerization), with or without part or all of the monomeric vinyl chloride, separately forming a homogeneous aqueous solution of water-soluble suspension agent (such as any of the water-soluble suspension agents commonly used in suspension polymerization) and water, dispersing the homogeneous water-immiscible solution in the homogeneous aqueous solution in such a manner as to form a suspension of droplets of water-immiscible phase, all of which droplets are homogeneous and of identical composition, in the homogeneous aqueous phase, incorporating at least a part of the monomeric vinyl chloride in the suspension prior to initiation of the polymerization step (since it is necessary that monomeric vinyl chloride be present in the mixture initially for polymerization to proceed), carrying out the suspension polymerization of the resulting suspension in the conventional manner, and recovering from the resulting mixture a binary copolymer of the vinyl chloride and the dialkyl maleate. In practicing my invention I employ the monomers in relative weight proportions of from 55 to 98% of vinyl chloride and from 2 to 45% of dialkyl maleate.

If desired, a minor proportion of the monomeric vinyl chloride can be added after initiation of the suspension polymerization.

Binary copolymers may be prepared by the process of my invention containing from 3% to 50% of the dialkyl maleate. Regardless of the relative proportions of vinyl chloride and maleate within this range, the method of my invention gives a copolymer completely free of inhomogeneities. My process gives a wide range of products, from rigid, board-like material to soft, tacky material. Such products find use in calendering, extrusion, molding, etc., and in general in any application where polyvinyl chloride itself is applicable. They can be extruded onto electrical conductors, e. g., copper wire, in place of the vinyl resins commonly used for wire insulation.

Within the range of from 3 to 50% of dialkyl maleate, those binary copolymers which contain from 30 to 50% of dialkyl maleate are internally plasticized and inherently flexible even in the absence of external plasticizer, and can be used to replace ordinary flexible highly plasticized polyvinyl chloride compounds. Those binary copolymers which contain from 15 to 30% of dialkyl maleate are harder and less flexible than the binary copolymers just mentioned and are adapted to be used in place of so-called "semi-rigid vinyl compounds," i. e., vinyl resins plasticized with approximately 20 to 40 parts of external plasticizer per 100 parts of vinyl. Still further, those binary copolymers which contain from 3 to 15% of dialkyl maleate are still harder and still less flexible than those containing more than 15% of the maleate and are adapted to be used in place of so-called "rigid vinyl compounds" which contain from 0 to about 20 parts of external plasticizer.

In ordinary polymerization operations, two procedures are commonly used, viz., emulsion polymerization ("A") and bead polymerization ("B") (also known as "pearl" or "suspension" polymerization). These two procedures and the preferred procedure ("C") of my invention are given in detail below for comparative purposes.

Exemplary polymerization recipes that may be used are as follows (parts by weight):

| | Emulsion (Procedure "A") | Bead (Procedures "B" and "C") |
|---|---|---|
| Water | 170 | 325 |
| Vinyl chloride | 70–90 | 70–90 |
| Maleate | 30–10 | 30–10 |
| Gelatin | | 0.75 |
| Sodium laurate | 0.8 | |
| Disodium phosphate (buffer) | 0.15–0.30 | |
| Lead acetate | | 0.20 |
| Lauroyl peroxide | | 0.60–1.00 |
| Potassium persulfate | 0.15–0.60 | |

As is obvious to anyone skilled in the art, the recipes given above use conventional chemicals to perform conventional functions. The recipes given above may be modified, using equivalent materials for equivalent functions, without destroying the validity of the comparison made herein between the method of my invention and conventional emulsion and suspension polymerization.

PROCEDURE "A"

In this procedure, first the water-soluble ingredients (including the water-soluble catalyst), dissolved in the water, are measured into a bomb. The monomers are then weighed in, the bomb is closed, and is agitated in a 50° C. bath for a period of from three to eight hours to effect polymerization. At the end of this period, excess vinyl chloride is vented off, and the polymer is obtained as a 30–35% solids latex which is flocculated, washed, filtered, etc., by conventional methods.

PROCEDURE "B"

In this procedure, the water and water-soluble materials are added to a bomb, the water-solubles being added as solutions. The bomb is then flushed with nitrogen. The maleate and the oil-soluble catalyst are then added. The vinyl chloride is then added and the bomb is closed and agitated in a 50° C. water bath for from 16 to 18 hours to effect polymerization. At the end of this period, the excess vinyl chloride is vented off, and the polymer recovered and worked up by filtering, drying, etc. by conventional methods.

PROCEDURE "C"

This is a novel modification of the bead polymerization method of procedure "B," and is the method of my invention.

A bomb is loaded with the water and water-soluble materials, and flushed with nitrogen. The nitrogen is then flushed out with vinyl chloride and the bomb is capped. Any vinyl chloride pressure that may be present is vented.

A second bomb is loaded with the oil-soluble catalyst, the maleate, and the vinyl chloride. The bomb is capped and the bomb and contents are then shaken for 5 minutes at 50° C. to insure a homogeneous solution. The solution in the second bomb is then transferred into the first, or vice versa, and polymerization and subsequent treatment are carried out as in procedure "B" above.

Although I prefer to follow the procedure outlined in the preceding two paragraphs, I can, if desired, reserve the addition of all or part of the vinyl chloride monomer, which is readily diffusible through water, until after the single-phase uniform oil-soluble solution has been dispersed in the aqueous phase. Also, if desired, I can add additional water-soluble material to the dispersion. The essential point is to get a dispersion of a homogeneous phase of the oil-soluble material in the aqueous phase before polymerization starts.

EXAMPLE I

The following example will demonstrate the disadvantages of conventional emulsion polymerization techniques of the prior art as compared to the known bead polymerization techniques of the prior art. This demonstrates completely that emulsion systems are impractical for making binary copolymers of vinyl chloride and dialkyl maleates which maleates contain more than seven carbon atoms in the alkyl group.

All copolymers of this example contained 80 parts of vinyl chloride and 20 parts of dialkyl maleate in the feed as indicated. The emulsion systems were polymerized by the method and recipe of procedure "A" above, while the bead polymerization systems were polymerized by the method and recipe of procedure "B." The copolymer products were analyzed for chlorine; the chlorine content was converted to vinyl chloride percentage and the percentage of combined dialkyl maleate was determined by difference.

*Binary copolymers from 80% vinyl chloride/20% dialkyl maleate feed*

| Maleic Ester | Percent Maleate in Copolymer | |
|---|---|---|
| | Emulsion Polymerization | Bead Polymerization |
| Diamyl Maleate | 24.4 | 26.4 |
| Dihexyl Maleate | 22.0 | 26.7 |
| Diheptyl Maleate | 10.0 | 23.5 |
| Dioctyl Maleate | 2.5 | 25.6 |
| Didecyl Maleate | 1.2 | 23.2 |
| Didodecyl Maleate | 1.0 | 26.0 |

As may be seen in the table above, the emulsion polymerization system, while quite satisfactory for dihexyl maleate and its lower homologs, begins to fail with the diheptyl maleate and is completely unsatisfactory for all homologs above the diheptyl maleate. In contrast, the bead system produces the expected binary copolymer for all maleates tested.

EXAMPLE II

While the binary copolymers produced by bead polymerization in Example I contain the two monomers in the desired over-all proportions, as shown by chlorine analysis, the binary copolymers produced are not satisfactory because of their particle-to-particle non-homogeneity. The following information illustrates how copolymers produced by the method of my invention (procedure "C" above) differ from and are an improvement over the non-homogeneous binary copolymers prepared by a conventional bead polymerization system (such as procedure "B" above).

Binary copolymers of vinyl chloride and di-tridecyl maleate (prepared from commercial tridecyl alcohol) were prepared by both procedure "C" and procedure "B". The monomer feed in both cases consisted of 70 parts vinyl chloride and 30 parts of the maleate. The copolymer prepared by procedure "B" (bead polymerization) contained "fish eyes" and, when an attempt was made to dissolve the copolymer in methyl ethyl ketone, approximately 5–10% of the copolymer was insoluble. Analysis (using the analytical procedure of Example I) of the reprecipitated soluble fraction and of the insoluble fraction gave the following results:

Percent maleate
Soluble fraction _____ 31.2
Insoluble fraction _____ 8.4

The quite different compositions of the two fractions, according to the above analysis, indicates that the copolymer prepared by the conventional bead polymerization system is non-homogeneous to a high degree.

In contrast, the binary copolymer prepared by the method of my invention (procedure "C" above) contained 35.9% maleate and was completely soluble in methyl ethyl ketone, showing no indication of non-homogeneous structure.

EXAMPLE III

The method of my invention produces polymers with superior physical properties. The following runs illustrate this point. Di-tridecyl maleate (made from commercial tridecyl alcohol as before) was used in these runs.

| Run | Percent Maleate in Feed | Percent Maleate in Polymer | Procedure | "Fish eyes" | Scott Tensile (R. T.) | 100% Modulus (R. T.) |
|---|---|---|---|---|---|---|
| 1 | 30 | 39.2 | B | Present | 1,010 | 460 |
| 2 | 30 | 39.5 | B | do | 856 | 425 |
| 3 | 30 | 36.0 | C | Absent | 2,140 | 775 |
| 4 | 30 | 35.8 | C | do | 2,330 | 680 |
| 5 | 30 | 37.4 | C | do | 2,280 | 800 |
| 6 | 30 | 38.1 | C | do | 2,270 | 760 |

Runs 1 and 2 were made by the conventional loading technique, procedure "B". Runs 3 and 4 were made according to procedure "C" of my invention as described above. Runs 5 and 6 were also made according to procedure "C" except that all of the vinyl chloride was withheld and added only after the solution of maleate and catalyst had been dispersed in the aqueous phase.

EXAMPLE IV

A binary copolymer of vinyl chloride and di-lauryl maleate was prepared by procedure "C" above from a feed consisting of 70 parts of vinyl chloride and 30 parts of the di-lauryl maleate. The resulting copolymer was then compounded according to the following formulation:

| | Parts |
|---|---|
| Binary copolymer | 100 |
| Whiting | 4.2 |
| "Titanox" ($TiO_2$) | 2.9 |
| Lead stearate | 1.7 |

The above materials were milled at 300° F. to uniformity. The resulting mixture was calendered onto cloth of the type commonly used as backing for calendered vinyl resin coatings. The resulting coated fabric was useful as upholstery material. It had superior aging properties in the "Weatherometer" because the coating contained no external plasticizer to be lost by leaching, etc.

EXAMPLE V

A binary copolymer of vinyl chloride and di-lauryl maleate was prepared from monomers consisting of 80 parts of vinyl chloride and 20 parts of di-lauryl maleate in accordance with our invention. The procedure used was procedure "C" modified in that all of the vinyl chloride was added after the solution of catalyst and maleate had been dispersed in the aqueous phase. The resulting binary copolymer was compounded according to the following formulations:

| | Composition D | Composition E |
|---|---|---|
| Binary Copolymer | 100 | 100 |
| Tribasic Lead Sulfate (Stabilizer) | 8 | 8 |
| Plasticizer (di-2-ethyl hexyl phthalate) | | 5 |
| Filler ("Pigment #33," electrical grade clay) | | 15 |

The above compositions were prepared in the obvious manner and extruded onto copper wire using conventional extruding technique, forming insulation 1/32" thick. The resulting insulated wires were tested by the standard water immersion test used for determining insulation resistance upon aging under water. The data were as follows:

*Insulation resistance in water—14 AWG, 1/32" insulation megohms/1000'*

| Composition | 16 hrs. at R. T. | 1 wk. at 50° C. | 3 wks. at 50° C. | 6 wks. at 50° C. |
|---|---|---|---|---|
| A | 10,000 | 5,650 | 4,580 | 4,100 |
| B | 5,400 | 3,120 | 3,060 | 2,520 |
| Typical Plasticized Flexible Polyvinyl Chloride Insulation [1] | 2,050 | 9.8 | 20.7 | 25.7 |

[1] See the following table:

| | Parts |
|---|---|
| Electrical Grade Polyvinyl Chloride | 100 |
| Tribasic Lead Sulfate | 8 |
| Di-2-ethyl Hexyl Phthalate | 60 |
| Filler (Pigment #33) | 15 |

The outstanding electrical properties of wire insulated with binary copolymers prepared in accordance with my invention are clearly evident from the above data.

Many advantages of my invention will be obvious to those skilled in the art. Whereas ordinary suspension polymerization techniques give inhomogeneous polymer containing a high proportion of "fish eyes," polymer made according to my invention is uniform and very clear. The polymers made according to my invention also are seen, from the data given in Example III, to have tensile strengths and moduli approximately twice the values for comparative copolymers made by conventional bead polymerization.

The alkyl groups in the dialkyl maleates used in practicing my invention usually will not contain more than eighteen carbon atoms per alkyl group. The two alkyl groups can be the same or can be different (either in number or in arrangement of carbon atoms). An example of dialkyl maleate wherein a substantial proportion of molecules undoubtedly embody different alkyl groups is that made from commercial lauryl alcohol which is a mixture of $C_{10}$ to $C_{14}$ alcohols. Another example is that made from commercial tridecyl alcohol, which is a mixture of isomeric tridecyl alcohols made by the "Oxo" process.

All proportions and percentages expressed herein are by weight.

Having thus described my invention, what I claim and desired to protect by Letters Patent is:

1. The method of making a thermoplastic, resinous binary copolymer of vinyl chloride and a dialkyl maleate having at least eight carbon atoms in each alkyl group, which comprises forming a homogeneous, water-immiscible solution of the monomeric dialkyl maleate and an oil-soluble catalyst of free radical polymerization, separately forming a homogeneous aqueous solution of water-soluble suspension agent and water, dispersing said first-named solution in said second-named solution to form a suspension of droplets of water-immiscible phase, all of which droplets are homogeneous and of identical composition, in the homogeneous aqueous phase, incorporating at least a part of the monomeric vinyl chloride in the suspension prior to initiation of the polymerization step, subjecting the suspension to suspension polymerization, the monomers subjected to suspension polymerization containing from 55% to 98% of vinyl chloride and from 2% to 45% of dialkyl maleate, and recovering from the resulting mixture a binary copolymer of said vinyl chloride and said dialkyl maleate.

2. The method of making a thermoplastic, resinous binary copolymer of vinyl chloride and a dialkyl maleate having at least eight carbon atoms in each alkyl group, which comprises forming a homogeneous, water-immiscible solution of the monomeric vinyl chloride, the monomeric dialkyl maleate and an oil-soluble catalyst of free radical polymerization, the monomeric vinyl chloride and the dialkyl maleate being present in said solution in relative proportions of from 55% to 98% of vinyl chloride and from 2% to 45% of dialkyl maleate, separately forming a homogeneous aqueous solution of water-soluble suspension agent and water, dispersing said first-named solution in said second-named solution to form a suspension of droplets of water-immiscible phase, all of which droplets are homogeneous and of identical composition, in the homogeneous aqueous phase, subjecting the resulting mixture to suspension polymerization, and recovering from the resulting mixture a binary copolymer of said vinyl chloride and said dialkyl maleate.

3. The method of making a thermoplastic, resinous binary copolymer of vinyl chloride and a dialkyl maleate having at least eight carbon atoms in each alkyl group, which comprises forming a homogeneous, water-immiscible solution of the monomeric dialkyl maleate and an oil-soluble catalyst of free radical polymerization, separately forming a homogeneous aqueous solution of water-soluble suspension agent and water, dispersing said first-named solution in said second-named solution to form a suspension of droplets of water-immiscible phase, all of which droplets are homogeneous and of identical composition, in the homogeneous aqueous phase, incorporating at least a part of the monomeric vinyl chloride with the resulting suspension, subjecting the resulting mixture to suspension polymerization, the monomers subjected to suspension polymerization comprising from 55% to 98% of vinyl chloride and from 2% to 45% of dialkyl maleate, and recovering from the resulting mixture a binary copolymer of said vinyl chloride and said dialkyl maleate.

References Cited in the file of this patent

UNITED STATES PATENTS 2,476,474  Baer ------------------ July 19, 1949